United States Patent
Lindinger et al.

(10) Patent No.: US 6,409,261 B1
(45) Date of Patent: Jun. 25, 2002

(54) OPENABLE MOTOR VEHICLE ROOF AND SWITCHING ELEMENT FOR ACTUATING THE OPENABLE MOTOR VEHICLE ROOF

(75) Inventors: Franz Lindinger, München; Frank Wätzig, Hochstadt, both of (DE)

(73) Assignee: Webasto Karosseriesysteme Gmbh, Stockdorf (DE)

( * ) Notice: Subject to any disclaimer, the term of this patent is extended or adjusted under 35 U.S.C. 154(b) by 0 days.

(21) Appl. No.: 09/323,691

(22) Filed: Jun. 2, 1999

(30) Foreign Application Priority Data

Jun. 2, 1998 (DE) .......................... 198 24 515

(51) Int. Cl.⁷ .............................. B60J 7/057
(52) U.S. Cl. ........................ 296/223; 200/4; 200/5 A
(58) Field of Search ..................... 296/223; 200/339, 200/341, 4, 5 A

(56) References Cited

U.S. PATENT DOCUMENTS

| | | | |
|---|---|---|---|
| 4,034,176 A | * | 7/1977 | Larson ........................ 200/5 A |
| 4,520,240 A | * | 5/1985 | Swindler ................. 200/339 X |
| 4,629,953 A | | 12/1986 | Inoue et al. ............. 296/223 X |
| 4,975,547 A | * | 12/1990 | Nakayama et al. .......... 200/5 R |
| 5,265,716 A | * | 11/1993 | Sawada et al. .............. 200/5 R |
| 5,721,405 A | * | 2/1998 | Hamada .................... 200/16 R |
| 5,749,617 A | | 5/1998 | Weissrich et al. ........ 296/117 X |
| 5,783,787 A | * | 7/1998 | Data ........................... 200/5 R |
| 5,923,007 A | * | 7/1999 | Emmert .................. 200/339 X |
| 5,951,100 A | * | 9/1999 | Ewing et al. ................ 296/214 |

FOREIGN PATENT DOCUMENTS

| | | | |
|---|---|---|---|
| DE | 44 11 388 | | 5/1995 |
| DE | 195 13 971 | | 10/1995 |
| JP | 0103826 | * | 4/1990 ................. 200/339 |

OTHER PUBLICATIONS

Web page, "Limbind.com", "switch product catalog", Jan.10, 2001.*

* cited by examiner

Primary Examiner—Dennis H. Pedder
(74) Attorney, Agent, or Firm—Nixon Peabody LLP; David S. Safran

(57) ABSTRACT

A switching element for actuating an openable motor vehicle roof in which at least one outer cover part can be actuated for closing or at least partially exposing of a roof opening (3) with a first drive (13) and in which at least one inner cover part (sliding inside roof lining 5) can be actuated with a second drive (18), actuation of the outer cover part (cover 4) being assigned to a first control (28) and actuation of the inner cover part (sliding inside roof lining 5) being assigned to a second control (29). For purposes of ease of operator control and economical production, the first control (28) and the second control (29) are combined in a single switching element.

14 Claims, 4 Drawing Sheets

OPENABLE MOTOR VEHICLE ROOF AND SWITCHING ELEMENT FOR ACTUATING THE OPENABLE MOTOR VEHICLE ROOF

BACKGROUND OF THE INVENTION

1. Field of the Invention

The invention relates to a switching element for actuating an openable motor vehicle roof in which at least one outer cover part can be actuated for closing or at least partially exposing a roof opening by means of a first drive and in which at least one inner cover part can be actuated by means of a second drive, actuation of the outer cover part being assigned to a first control and actuation of the inner cover part being assigned to a second control.

2. Description of Related Art

In a switching element of the type to which the present invention is directed that is known from published German Patent Application DE 195 13 971 A1, there are four separate controls via which the cover and the sliding inside roof lining are pushed or raised via the control circuit. Here, the difficulty of operation and relatively high costs due to use of a total of four separate controls are disadvantages.

SUMMARY OF THE INVENTION

In view of this prior art, a primary object of the present invention is to devise a motor vehicle roof of the initially mentioned type which has a simplified actuating capacity in terms of costs and ergonomic aspects.

This object is achieved in accordance with the invention by the first control for actuating the outer cover part and the second control for actuating the inner cover part being combined in a single compact switching element. This action benefits operator control and ensures an economical implementation as compared to the switching element in the prior art with four separate controls.

According to a first advantageous aspect of the invention, a switching element is provided in which one control, preferably the second control, is located in a recess of the first control, the two controls preferably being made as rocker elements.

According to a second advantageous aspect of the invention, the first control and the second control are made as an integral control which preferably has the form of a rocker which, in addition to its rocking motion, can be pushed laterally in the direction of the rocker axis, in order to thus assume the function of the second control, the function of the first control being undertaken by the rocker.

According to a third advantageous aspect of this invention, there is a third control for purposes of controlling the raising/lowering motion of the outer cover part. This third control, according to a preferred embodiment of the invention, is located either in the contour of the first or second control, or is located outside of the single switching element which comprises the first control and the second control. Preferably, the third control has the form of a pushbutton element or a pull-actuation element or combination thereof.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
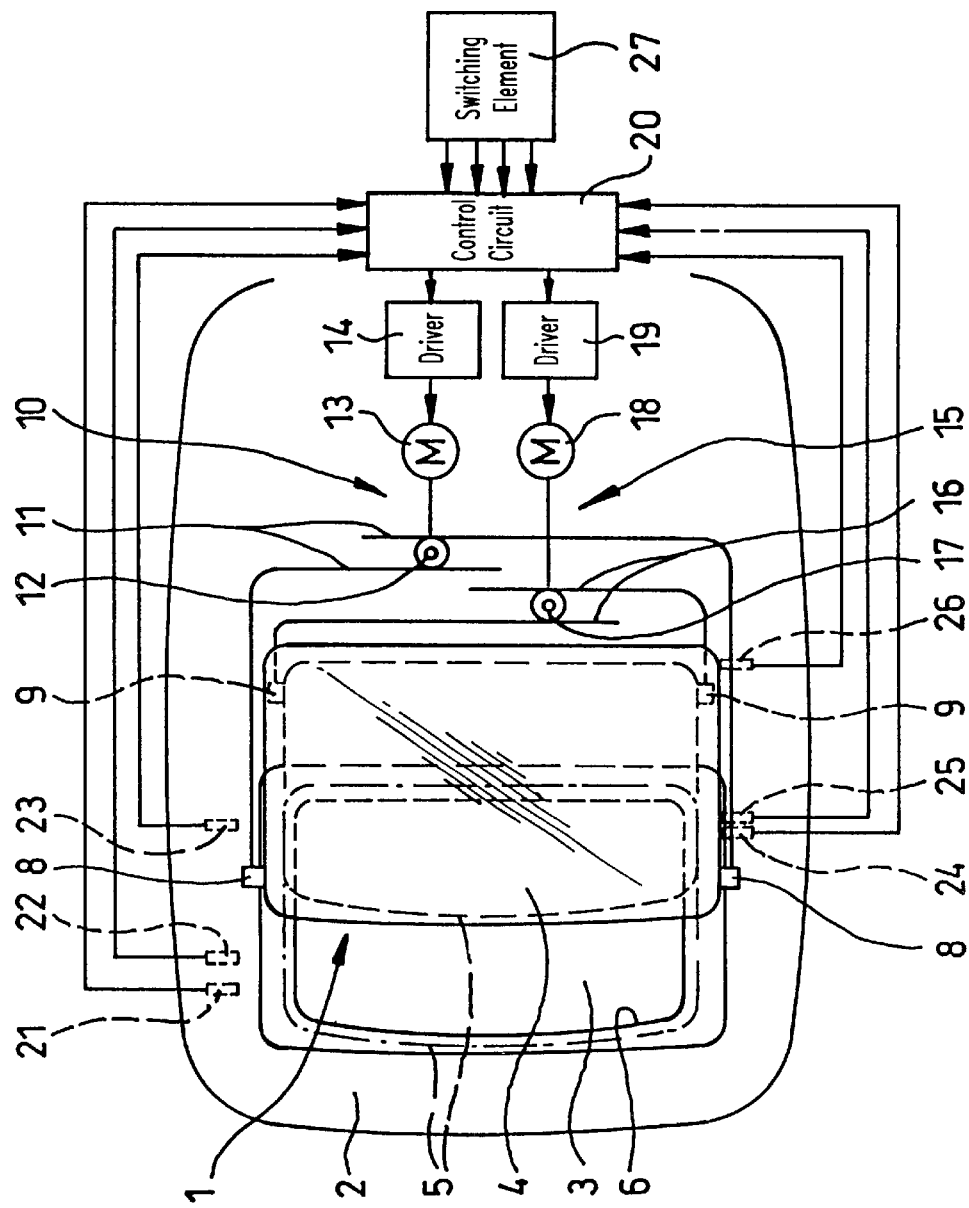
FIG. 1 shows a schematic overhead view of a motor vehicle roof with a sliding and lifting cover and movable inside roof lining part which are in the closed position.

FIG. 1 shows an roof arrangement 1 comprised of a sliding and lifting cover 4 and a sliding inside roof lining 5 used to close a roof opening 3 which is made in a fixed motor vehicle roof 2. The roof opening 3 can be selectively closed or at least partially exposed by means of cover 4 (which is transparent or translucent) by pushing and/or raising the cover 4. Under the motor vehicle roof 2, a frame is attached in which a frame opening 6 is, preferably, roughly congruent to the roof opening 2. The frame opening 6 can be selectively closed or at least partially exposed with sliding inside roof lining 5. The frame carries guide rails (which are not shown) which run along the two sides of the roof opening 3. The arrangement 1 is essentially mirror symmetrical with reference to the longitudinal center line of the motor vehicle roof 2. Consequently, only the structure in the area of one roof side need be explained.

Along the guide rail, there are a guide shoe (not shown) and a carriage 8 which can move in the longitudinal direction of the roof, the carriage 8 fitting into a crank slot of a raising lever (not shown), which is rotationally joined to the shoe in its forward section and which is permanently connected to the cover 4. This arrangement represents an opening/closing mechanism for the cover 4. There is a similar opening/closing mechanism in interaction with a guide shoe for the sliding inside roof lining 5.

The opening/closing mechanism of the cover 4 is actuated by a drive 10 which is comprised of a drive cable 11 connected to the carriage 8, a motor 18 which is connected via a transmission 12 to the drive cable 11, and a driver 14 for the motor 18. Similarly, the opening/closing mechanism of the sliding inside roof lining 5 is actuated by a drive 15 having a drive cable 16 which is connected to a carriage (not shown), a motor 18 which is connected via a transmission 17 to the drive cable 16, and a driver 19 for the motor 18.

The drive 10 for the cover 4 and the drive 15 for the sliding inside roof lining 5 are connected to a control circuit 20 and are controlled by the latter in the manner explained below. The control circuit 20 acquires status signals from different sensors 21 (signal with cover 4 closed), 22 (signal with cover 4 raised), 23 (signal with cover 4 completely opened), 24 (signal with inside roof lining 5 raised), 25

(signal with inside roof lining 5 closed) and 26 (signal with inside roof lining 7 completely opened). In addition, the control circuit 20 receives signals from a switching element 27.

FIGS. 2 to 6 show different embodiments of the switching element 27 in accordance with the present invention. The switching element 27 comprises a first control 28 for actuating the cover 4, a second control 29 for actuating the sliding inside roof lining 5, and a third control 30 which is designed to raise or lower the cover or alternatively to centrally actuate the cover 4 and the sliding inside roof lining 5 into the closed position.

The first control 28 and the second control 29 are each made as a rocker element, the rocker-like first control having a larger external outline contour than the rocker-like second control 29 which is located in a rectangular recess within the first control. Similarly, the third control which is made as a circular pressure-actuated switch element is located in a circular central recess of the second control 29. The first control and the second control, which are each elongated rocker switch elements, lie on a common longitudinal center axis 31 which also forms the longitudinal center axis of the switching element 27 or that of a rectangular frame 32 into which the first control 28, together with the second control 29 and the third control 30, is inserted.

The switching element 2 shown in FIG. 2 works as follows: Actuating the end of the rocker-like first switching element 28 which is the end which is on the left in FIG. 2 moves the cover 4 into its closed position. Actuating the other end of the rocker-like first switching element 28 moves the cover 4 into its open position. Similarly, actuating the end of the rocker-like second switching element 29 which is the end which is on the left in FIG. 2 moves the sliding inside roof lining 5 into its closed position, while actuating the other end of this control moves the sliding inside roof lining 5 into its open position. When the third control 30 is assigned to raising or lowering the cover 4, actuation of the third control 30, which is made as a pushbutton, leads either to raising or lowering the cover 4. On the other hand, the third control 30 is intended for central closing actuation of the cover 4 and the sliding inside roof lining 5, the cover 4, and the sliding inside roof lining 5 are moved jointly into the closed position by its actuation.

Figure 2:
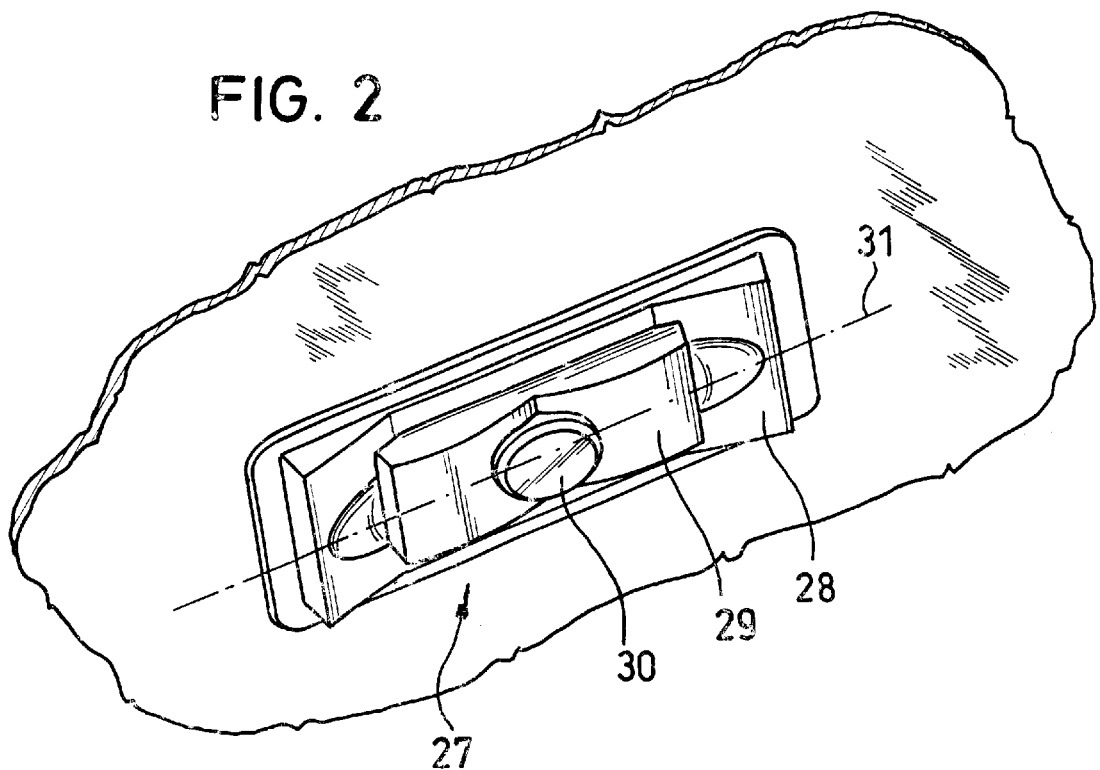
FIG. 2 shows a first embodiment of the switching element in accordance with the present invention with a first control, and a second control which is located within the outline of the first control, and a third control which is located within the outline of the second control.
Figure 3:
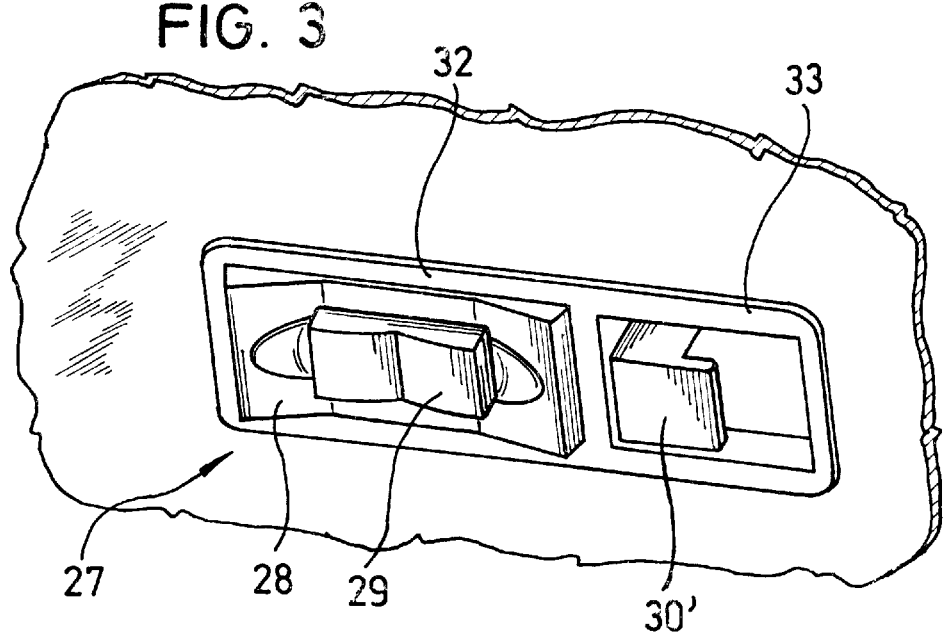
FIG. 3 is a perspective view of a second embodiment of the switching element according to the invention in which the third control is located outside the outline of the first and second controls.

FIG. 3 shows a second embodiment of the switching element 27 in accordance with the invention, the same reference numbers as in FIG. 2 being used for the same components. The embodiment of the switching element 27 in FIG. 2 differs from the switching element 27 of FIG. 3 in that the third control 30' is not located within the outline of the second control 29, but instead is located in a part 33 of the frame 32 which is extended rearward from the area in which the first control 28 is located. In particular, the third control 30' is located in that part of the frame elongation 33 which adjoins the frame 32, so that, in the rear area of the frame extension part 33, an engagement space remains via which an operator can reach with one finger underneath the undercut third control 30 in order to pull this control down (outward) for lowering the cover 4. To raise the cover 4, the control 30' is pushed upward (inward) by means of its outer side which faces downward (outward).

Figure 4:
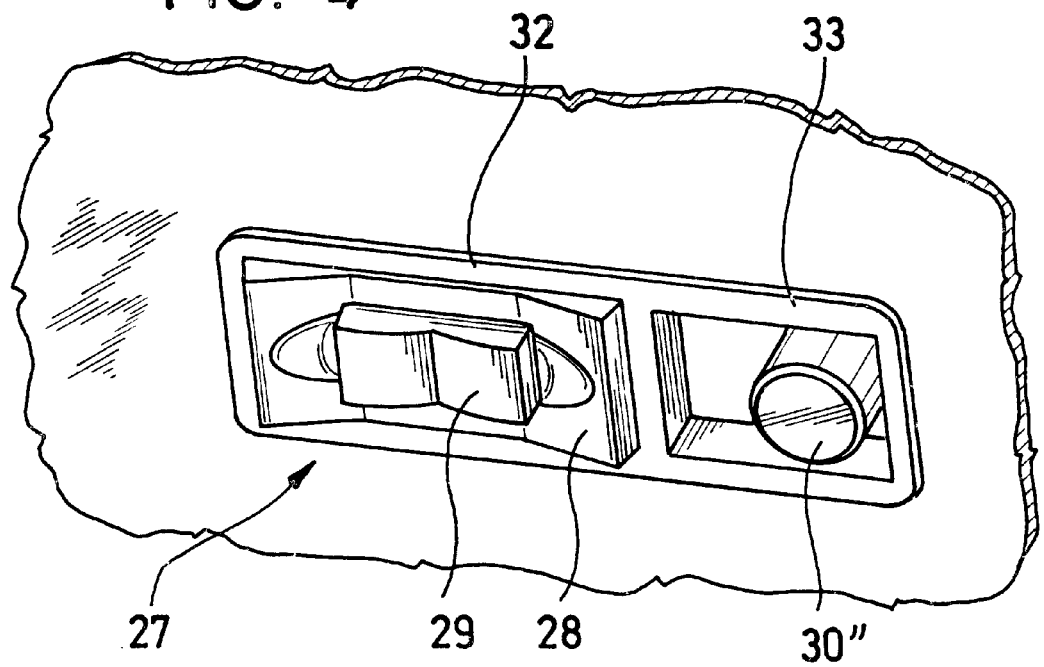
FIG. 4 is a perspective view of a third embodiment of the switching element according to the invention which is similar to the second embodiment with a modification of the third control.

A modification of the switching element from FIG. 3 is shown in FIG. 4. In this switching element, in contrast to FIG. 3, the third control 30" is located in the rear area of the frame extension 33, generally has a cylindrical shape, and is designed to work as a pushbutton in order to either raise or lower the cover 4 when pressure is applied, similar to push button control 30 of FIG. 2.

Figure 5:
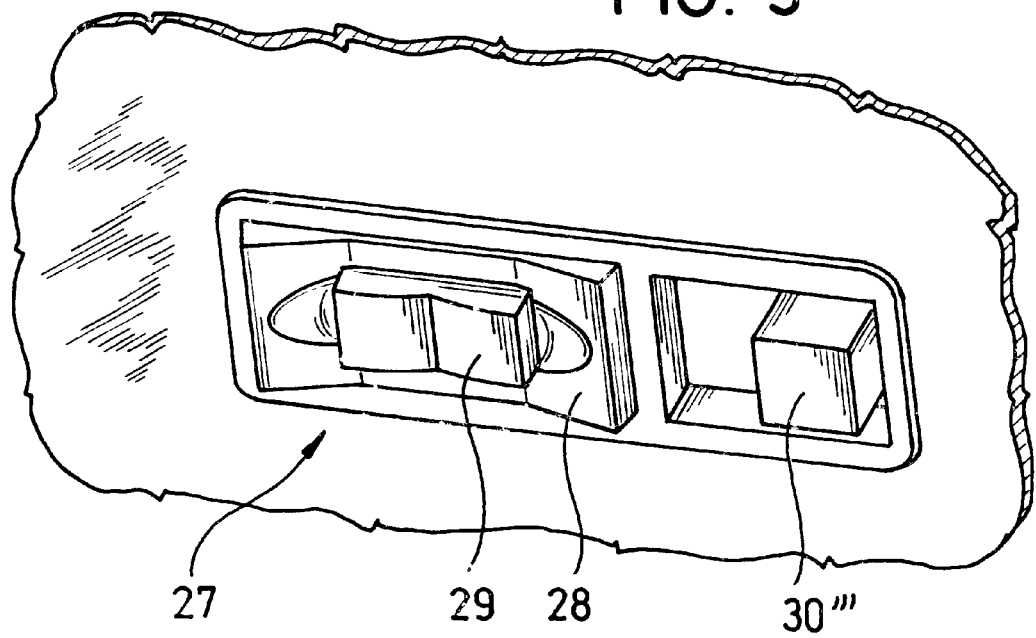
FIG. 5 shows a fourth embodiment of the switching element according to the invention which is also similar to the second embodiment with a modification of the third control.

Another modification of a third control 30'" located in the frame extension 33 is shown in FIG. 5. This control 30'" has a general cuboidal shape and is made, as in the embodiment shown in FIG. 4, preferably as a pushbutton element.

As an alternative to the aforementioned, the third control 30" or 30'" can also be formed as a sliding actuation element.

Figure 6:
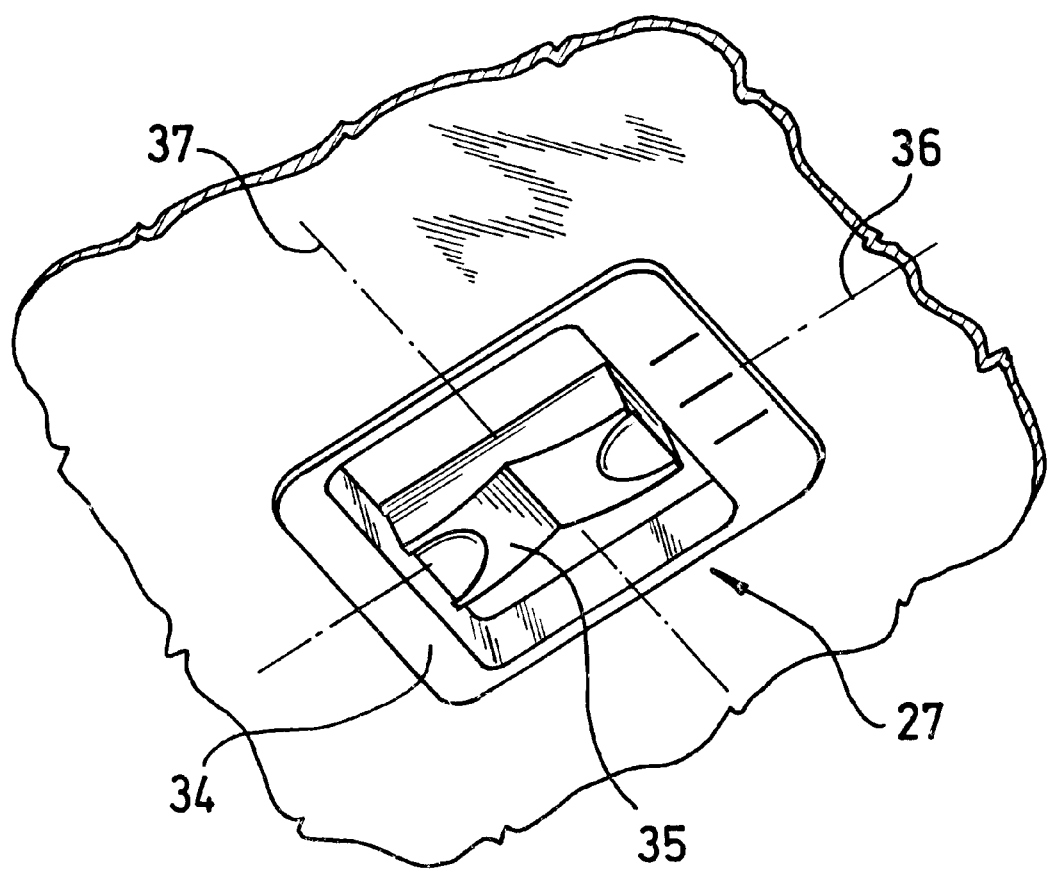
FIG. 6 is a perspective view of a fifth embodiment of the switching element in accordance with the invention in which the first control is made as a rocker which can be moved parallel to the rocker axis to perform the function of the second control.

FIG. 6 shows another embodiment of the switching element 27 in accordance with the invention. This switching element comprises a frame 34 in which there is located a rocker-like control 35 which has a lengthwise axis which, in the rest position, coincides with the center longitudinal axis 36 of the frame 34. The rocker-like control 35 is used to actuate the cover 4 in the same way as the first control 28 in the embodiments as shown in FIGS. 2 to 5. The rocker-like control 35 can additionally be displaced in the direction of its rocker axis 37, the frame 34 allowing and optionally limiting this displacement by its width dimension perpendicular to its longitudinal center axis 36. The displacement of the control 35 along the rocker axis 37 causes actuation of the sliding inside roof lining 5; that is, the sliding inside roof lining 5 can be opened or closed by a displacement motion of the control 35 along the rocker axis 37.

Although not shown, a pushbutton control with the function of the third control 30 of the preceding embodiments can be located in a central recess of the control 35. In such a case, sufficient clearance would need to be left in the recess between the control 35 and the third control to allow relative lateral displacement between them when the control 35 is laterally displaced along axis 37.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Switching element for actuating an openable motor vehicle roof in which at least an outer cover part is actuatable for closing and at least partially exposing of a roof opening in a fixed roof surface by means of a first drive and in which at least one inner cover part is actuatable by means of a second drive, comprising a first control for selection and actuation of the outer cover part and a separate second control for selection and actuation of the inner cover part; wherein the first control and the second control are combined in a single switching element and are located extending along a common axis; wherein one of the controls is encompassed within a perimeter of the other control in a manner enabling simultaneous actuation of the drives for both the at least one outer cover part and said at least one inner cover part in the same manner with respect to said common axis.

2. Switching element as claimed in claim 1, wherein the first control has a recess within which the second control is located.

3. Switching element as claimed in claim 1, wherein the first control is adapted for actuating the outer cover part in a first of two opening and closing directions; and a third control is provided for actuating opening and closing of the cover part in a second one of said two opening and closing directions.

4. Switching element as claimed in claim 3, wherein the third control is located within the outline of the first or second control.

5. Switching element as claimed in claim 1, wherein a third control is provided for central closing actuation of both the outer cover part and the inner cover part.

6. Switching element as claimed in claim 5, wherein the third control is located within the outline of the first or second control.

7. Switching element as claimed in claim 1, wherein the first and second controls are made as rocker switch elements.

8. Switching element as claimed in claim 3, wherein the third control is a pushbutton element.

9. Switching element as claimed in claim 3, wherein the third control is a pull-actuated element.

10. Switching element as claimed in claim 5, wherein the third control is a pushbutton element.

11. Switching element as claimed in claim 5, wherein the third control is a pull-actuated element.

12. An openable motor vehicle roof in which at least an outer cover part is displaceable for closing and at least partially exposing of a roof opening in a fixed roof surface by means of a first drive and in which at least one inner cover part is displaceable by means of a second drive, a first control being provided for selection and actuation of the outer cover part and a separate second control being provided for selection and actuation of the inner cover part; wherein the first control and the second control are combined in a single switching element and are located extending along a common axis; wherein one of the controls is encompassed with a perimeter of the other control in a manner enabling simultaneous actuation of the drives for both the at least one outer cover part and said at least one inner cover part in the same manner with respect to said common axis.

13. Openable motor vehicle roof as claimed in claim 12, wherein the first and second controls are made as rocker switch elements.

14. Openable motor vehicle roof as claimed in claim 12, wherein the first control actuates the outer cover part in a first of two opening and closing directions; and a third control is provided for actuating opening and closing of the outer cover part in a second one of said two opening and closing directions.

* * * * *